(No Model.)

F. STANKE.
FRUIT GATHERER.

No. 441,859. Patented Dec. 2, 1890.

Witnesses,

Inventor,
Florian Stanke
by Dewey & Co.
attys

United States Patent Office.

FLORIAN STANKE, OF SAN FRANCISCO, CALIFORNIA.

FRUIT-GATHERER.

SPECIFICATION forming part of Letters Patent No. 441,859, dated December 2, 1890.

Application filed July 22, 1890. Serial No. 359,562. (No model.)

*To all whom it may concern:*

Be it known that I, FLORIAN STANKE, a citizen of the United States, residing in the city and county of San Francisco, State of California, have invented an Improvement in Pruning-Shears and Fruit-Pickers; and I hereby declare the following to be a full, clear, and exact description of the same.

My invention relates to the class of pruning-shears and fruit pickers or gatherers in which the shears are fitted to the end of a long pole and are adapted to cut the branches or the stems of the fruit, the fruit then dropping into a hopper or mouth on the head of the pole directly underneath the shears, and from which said hopper or mouth a conveyer extends down to a suitable receptacle below.

My invention consists in the novel construction of the shears and of the conveyer and its entrance or head, all of which I shall hereinafter fully describe, and specifically point out in the claims.

The object of my invention is to provide a device of this character which is adapted to cut fruit conveniently, no matter in what position it may be located, and to convey it below without bruising it, and, further, to provide a shears which is not only adapted for the picking of fruit, but is adapted for general pruning purposes.

Figure 1:
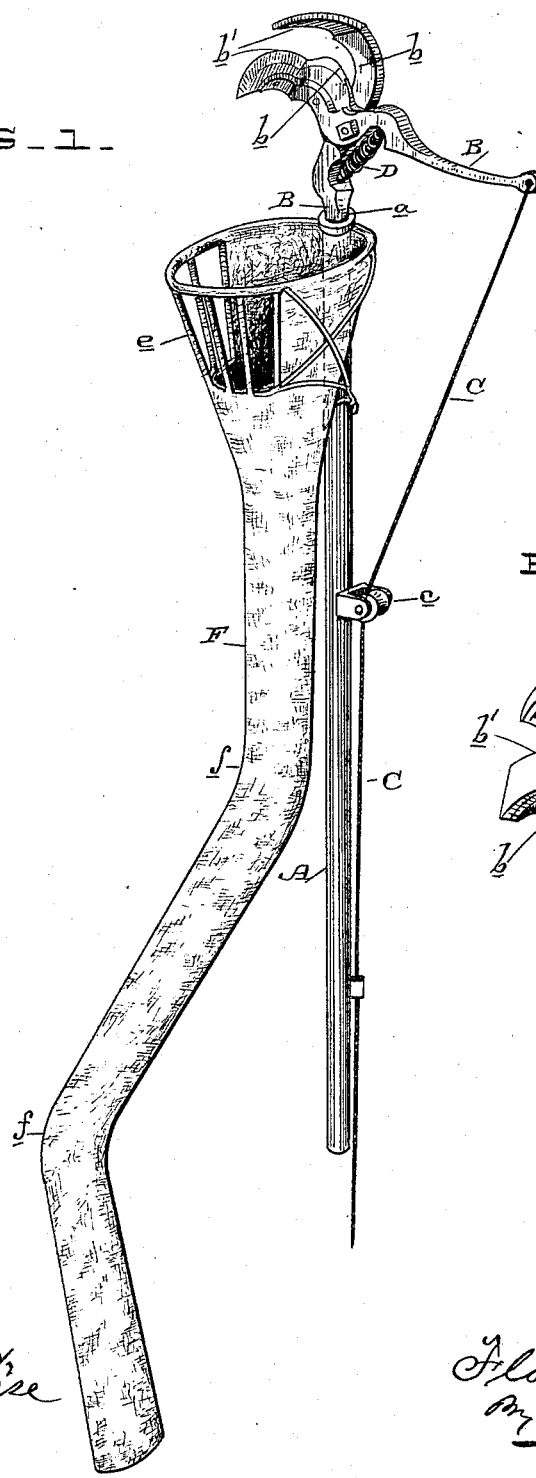
Figure 2:
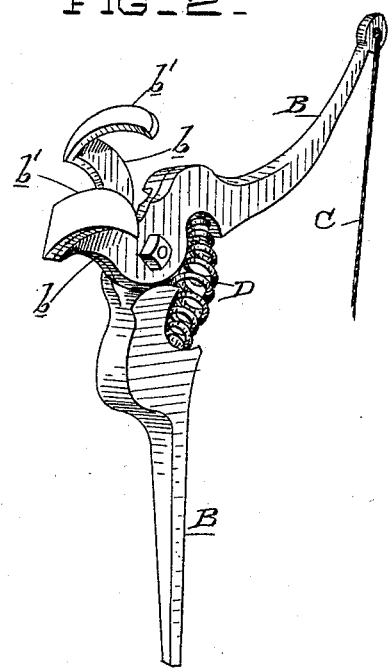

Referring to the accompanying drawings for a more complete explanation of my invention, Figure 1 is a perspective view of my device. Fig. 2 is a perspective view of the shears.

A is a pole of any suitable length, having a socket or ferrule $a$ on its top. The shears are made with opposing jaws $b$, which extend in the line of their respective handles B, and also with opposing jaws $b'$, which project at an angle from the ends of the jaws $b$. All the jaws may be knives, if desired, or only those on one side, as here shown, those on the other being resisting surfaces. The knife-jaws may be a separate piece or pieces bolted to a bed-piece, so that they may be easily removed and replaced. One of the handles B is fitted into the ferrule $a$, and the other handle has connected with it a wire or cord C, which passes down through a suitable roller-guide $c$ on the pole to within reach of the operator. A spring D is located between the handles, so as to open the blades. A hopper or mouth-piece E, consisting of any suitable light frame-work, is attached to the top of the pole, this hopper being covered and lined with suitable fabric to prevent the bruising of the fruit falling into it, and it has an open barred front $e$, through which the shears may be seen in order to effect their proper adjustment for operation upon the stem of the fruit or the limb. The bars of the open front are covered with fabric to prevent the bruising of the fruit. From this hopper or mouth-piece extends downwardly a conveyer F, made of suitable fabric and so shaped that throughout its length it shall have an angular course formed by bends at suitable points, such as at $f f$. These bends form stoppages for arresting the downward course of the fruit and prevent it from being bruised by the time it reaches the lower end of the conveyer, at which point there is a suitable receptacle for it.

The operation of the device generally is the same as in pruners, pickers, and gatherers of this class; but the improvement in the shears enables me to reach conveniently any point desired. The lineal blades will reach the horizontal or nearly horizontal stems and limbs, while the angular blades will reach vertical or nearly vertical stems and limbs, thus giving the operator, without inconvenience, an opportunity to reach any fruit or limb desired. The bends in the conveyer avoid, as above described, the bruising of the fruit as it drops through, while the open front of the hopper or mouth-piece at the top allows the operator to see the shears, so that he can place them upon the limb or fruit in any desired position. When the device is to be used for pruning only the conveyer with its mount or hopper is removed from the pole, leaving the shears so that they may work without hindrance.

Having thus described my invention, what I claim as new, and desire to secure by Letters Patent, is—

1. The shears having the opposing jaws $b$ in line with the handles and the opposing jaws $b'$ extending from the ends of jaws $b$ and at an angle with said jaws, substantially as herein described.

2. The combination of the pole, the shears secured to its upper end and having the jaws $b$ and $b'$ at an angle with each other, the conveyer secured to the pole, and the mouth or hopper of said conveyer, having a barred front, whereby the shears can be seen to direct them properly, substantially as herein described.

3. A fruit-picker consisting of the pole, the shears having the jaws $b$ and $b'$ at an angle with each other, as described, the cord or wire for operating the shears, and the conveyer having the tortuous passage, substantially as herein described.

4. A fruit-picker consisting of the pole, the shears having the jaws $b$ and $b'$ at an angle with each other, as described, the cord or wire for operating the shears, the conveyer having a tortuous passage, and the mouth or hopper of the conveyer, having a barred front, substantially as herein described.

In witness whereof I have hereunto set my hand.

FLORIAN STANKE.

Witnesses:
S. H. NOURSE,
H. C. LEE.